(12) United States Patent
Johnson et al.

(10) Patent No.: US 7,235,180 B2
(45) Date of Patent: Jun. 26, 2007

(54) SULFATE-SELECTIVE ANION EXCHANGE RESINS FOR USE IN COMBINATION WITH TRSS RESINS IN FEED WATER TREATMENT

(75) Inventors: Roger E. Johnson, Reno, NV (US); Gerald Colombo, Myrtle Creek, OR (US)

(73) Assignee: Novation Environmental Technologies, Inc., Sparks, NV (US)

( * ) Notice: Subject to any disclaimer, the term of this patent is extended or adjusted under 35 U.S.C. 154(b) by 0 days.

(21) Appl. No.: 11/225,942

(22) Filed: Sep. 13, 2005

(65) Prior Publication Data

US 2006/0054561 A1  Mar. 16, 2006

Related U.S. Application Data

(60) Provisional application No. 60/610,459, filed on Sep. 15, 2004.

(51) Int. Cl.
*B01D 21/30* (2006.01)

(52) U.S. Cl. .......................... 210/670; 210/673; 210/683
(58) Field of Classification Search ................ 210/670, 210/673, 683
See application file for complete search history.

(56) References Cited

U.S. PATENT DOCUMENTS 4,184,948 A * 1/1980 Dabby et al. ............... 210/662

* cited by examiner

*Primary Examiner*—Chester T. Barry
(74) *Attorney, Agent, or Firm*—Kirkpatrick & Lockhart Nicholson Graham LLP

(57) ABSTRACT

An improved system of resins comprising a combination of a sulfate-specific strongly basic anion exchange resin and a heterogenous hybrid thermally regenerable salt sorbent (TRSS) resin is provided. The anion exchange resin contains triethylamine and/or tributylamine groups. The TRSS resin comprises a macroporous host copolymer and a crosslinked guest copolymer having, respectively, weak acid groups and weak base groups. The system is used to treat feed water containing dissolved ions, including sulfate ions, and is efficiently regenerated.

8 Claims, 1 Drawing Sheet

SULFATE-SELECTIVE ANION EXCHANGE RESINS FOR USE IN COMBINATION WITH TRSS RESINS IN FEED WATER TREATMENT

PRIORITY OF RELATED APPLICATIONS

Priority is claimed under 35 USC 119(e) of Provisional Application Ser. No. 60/610,459, filed Sep. 15, 2004, which is incorporated by reference herein.

BACKGROUND OF THE INVENTION

The invention pertains to use of sulfate-selective highly basic anion exchange resins in combination with TRSS resins for removing or reducing the concentration of dissolved salts, including sulfates, contained in an aqueous fluid.

Thermally regenerable salt sorbent (TRSS) resins are hybrid resins which contain both weak acid and weak base groups that can form internal zwitterions. Both anions and cations can be removed from feed water with TRSS resins, then the resin can be regenerated simply by thermal treatment which releases the captured ions, thereby re-forming the internal zwitterions.

However, the presence of sulfate ions in the feed water can be problematic to treatment with TRSS resins. The capacity of such resins may be reduced when sulfate ions occur with calcium cations in the feed. Presumably the reason for the reduced capacity is that both calcium and sulfate ions are returned together in the regenerant fluid and calcium sulfate precipitates with the resin bed at the temperatures used for regeneration. One proposed solution to this problem is to pre-treat the feed with the conventional type 1 strongly sulfate-selective trimethylamine anion exchange resin or a less sulfate-selective type 2 resin, such as dimethylethanolamine, to preferentially remove the sulfate ions and exchange them with chloride ions from the exchange resin. The feed could then be treated with the TRSS resin. The spent regenerant from the TRSS treatment would be enriched in chloride ion which in turn could be used to regenerate the anion exchange resin. See U.S. Pat. No. 4,184,948.

However, we have found that the regeneration of the conventional basic trimethylamine or dimethylethanolamine anion exchange resins using the regenerant from the TRSS treatment is not efficient. This is due to the lower concentration of chloride ion in the spent regenerant from TRSS treatment compared to the chloride ion concentration in brine typically used to regenerate anion exchange resins. While not intending to be bound by any theory, it seems that the sulfate ions are bound too strongly to the anion exchange resin to be effectively regenerated in low concentrations of brine.

We have found that when using a spent regenerant from TRSS treatment to regenerate a sulfate-selective highly basic anion exchange resin, an anion exchange resin with a lower selectivity for sulfate than trimethylamine- or dimethyethanolamine-containing resins is advantageous.

As used herein, the term "elution" refers to the removal of ions, cations and/or anions, which have been loaded on to the resin during the absorption process. The term "regeneration" refers to restoration of the functional groups to the resin to the zwitterion on a TRSS resin, or replacement of the captured anions with anions in the regeneration fluid in an anion exchange resin. These operations are each thermally activated and essentially simultaneously occur. Therefore, elution will necessarily also involve regeneration.

SUMMARY OF THE INVENTION

A method is provided by the present invention for treating an aqueous fluid to substantially reduce the concentration of dissolved salts including sulfates, that is, the cations and anions, contained therein comprising:

(a) contacting a first volume of the fluid with a mass of sulfate-specific strongly basic anion exchange resin containing strongly basic groups selected from the group consisting of triethylamine, tributylamine and combinations thereof;

(b) then contacting the first volume of the fluid within a first temperature range with a mass of thermally regenerable hybrid resin having two relatively independently phases, the first phase comprising a host macroporous copolymer of a polyunsaturated monomer and a monoethylenically unsaturated monomer containing a weak acid group, and a second phase comprising a crosslinked guest copolymer of a polyunsaturated monomer and a monoethylenically unsaturated monomer a containing a weak base group; wherein the pores of the host macroporous copolymer of the first phase are at least partially filled with the guest copolymer of the second phase;

(c) collecting the first volume of fluid from the hybrid resin.

The method further provides steps for regenerating the resins by:

(d)(i) regenerating the hybrid resin by elution with a regenerant fluid within a second temperature range wherein the second temperature range is greater than the first temperature range to produce a spent regenerant fluid; and (d)(ii) regenerating the basic anion exchange resin by elution with the spent regenerant fluid from step (i);

(e) collecting the spent regenerant fluid from step (ii).

The treatment of the fluid can be continued by repeating steps (a), (b) and (c) using a second volume of the fluid, followed by regeneration.

The first temperature range is typically about 5° C. to 25° C.

Useful weak base groups on the hybrid resin are dialkylamine groups and useful weak acid groups are carboxylic acid groups.

The invention also provides a resin system for treating an aqueous fluid to substantially reduce the concentration of dissolved salts comprising sulfates contained therein, comprising:

(a) a mass of sulfate-specific basic anion exchange resin containing basic groups selected from the group consisting of triethylamine, tributylamine and combinations thereof; and (b) a mass of thermally regenerable hybrid salt sorbent resin having two relatively independent phases comprising a first phase comprising a host macroporous copolymer of a polyunsaturated monomer and a monoethylenically unsaturated monomer containing weak acid groups and further comprising a second phase comprising a crosslinked guest copolymer of a polyunsaturated monomer and a monoethylenically unsaturated monomer containing weak base groups; wherein the pores of said host macroporous copolymer of said first phase are at least partially filled with the guest copolymer of the second phase;

(c) containment for the masses of resins whereby the aqueous fluid may flow sequentially through the mass of basic anion exchange resin and the mass of hybrid salt sorbent resin.

The system may also comprise a source of the aqueous fluid and an inlet to the containment for introducing the aqueous fluid to the mass of basic anion exchange resin.

The system also may comprise a source of a regenerant fluid and an inlet in the containment for introducing the regenerant fluid to the mass of hybrid salt sorbent resin whereby the regenerant fluid may flow sequentially through the mass of hybrid salt sorbent resin and mass of basic anion exchange resin.

BRIEF DESCRIPTION OF THE FIGURE

In the accompanying FIGURE a diagram is shown of a synthetic method for producing the preferred TRSS resins.

DETAILED DESCRIPTION OF THE PREFERRED EMBODIMENTS

Figure 1:
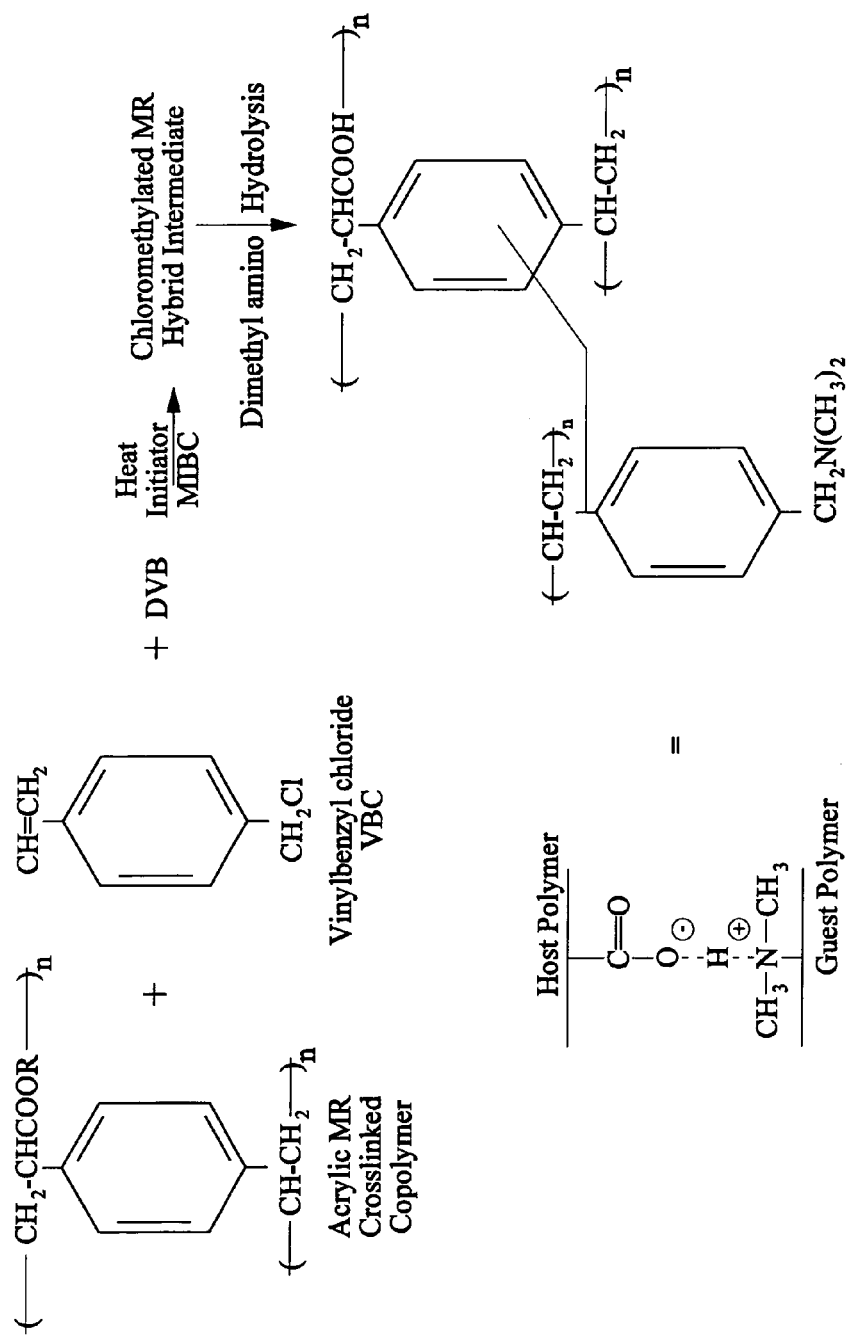

The anion exchange resins with a lower selectivity for sulfate ions will be referred to herein as the sulfate-specific strongly basic anion exchange resins. They contain triethylamine and/or tributylamine groups which are less specific for binding sulfate ions compared to strongly basic anion exchange resins containing, for example, trimethylamine or dimethylethanolamine groups. They may be prepared by methods shown in U.S. Pat. No. 2,629,710, incorporated by reference herein.

Numerous TRSS resins are known and may be used in accordance with the present invention. See U.S. Pat. Nos. 3,991,017 and 4,184,948, incorporated by reference herein.

The preferred TRSS resins used in accordance with the invention are formed from a precursor resin. The precursor resin is formed by forming a crosslinked guest copolymer comprising a polyunsaturated monomer and a monoethylenically monomer containing a haloalkyl group in the presence of a host macroporous copolymer formed from a polyunsaturated monomer and a monoethylenically unsaturated monomer containing a functionality convertible to a weak acid group. The precursor resin formed is a hybrid copolymer containing a crosslinked macroporous host copolymer phase containing functionalities convertible to weak acid groups, having at least some of the pores filled with a crosslinked guest copolymer phase containing haloalkyl groups. The precursor resin is then formed into the thermally regenerable hybrid resin by treatment with a weak base to at least partially convert the haloalkyl groups to weak base groups to form a heterogenous hybrid base resin; and treating the heterogenous hybrid base resin with a hydrolyzing agent to thereby at least partially convert the functionalities to weak acid groups to form a heterogenous hybrid thermally regenerable resin having two relatively independent phases, one phase comprising the host macroporous copolymer having weak acid groups, and the other phase comprising the crosslinked guest copolymer having weak base groups.

The combined use of sulfate-specific anion exchange resins and TRSS resins according to the present invention is advantageous for deionizing aqueous fluids, desalination, water purification, water softening, metals recovery and other applications requiring removal of ions, including sulfate ions, from an aqueous source.

The sulfate-specific strongly basic anion exchange resins contain triethylamine and/or tributylamine groups.

The TRSS resins are hybrid resins in the form of beads which have as a macroporous matrix a host copolymer of a polyunsaturated monomer containing weak acid groups with the macropores in the matrix being at least partially filled with the crosslinked guest copolymer of a polyunsaturated monomer and a monoethylenically unsaturated monomer containing weak basic groups.

The TRSS resin is made by polymerization of a mixture of guest copolymer precursor monomer or monomers and chain extenders in the presence of a host precursor macroporous copolymer. The resultant macroporous copolymer will be a precursor form in which the weak acid groups are protected functionalities, such as carboxylic acid esters, which are convertible to weak acids. The precursor monomers of the guest copolymer bear functional groups which are precursors in that they are convertible to weak basic groups.

The backbone of the host macroporous copolymer will be a crosslinked copolymer of (1) a polyunsaturated monomer containing a plurality of non-conjugated ethylenic groups ($CH_2=C-$) and (2) a monoethylenically unsaturated monomer, either aromatic or aliphatic.

Suitable polyunsaturated monomers include divinylbenzene, divinyltoluenes, divinylnaphthalenes, diallyl phthalate, ethylene glycol diacrylate, ethylene glycol dimethacrylate, trimethylolpropane trimethacrylate, neopentyl glycol dimethacrylate, bis-phenol A dimethacrylate, pentaerythritol, tetra- and trimethacrylates, divinylxylene, divinylethylbenzene, divinylsulfone, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallyl aconitate, triallyl citrate, triallyl phosphate, N,N'-methylenediacrylamide, N,N'-methylene dimethacrylamide, N,N'-ethylenediacrylamide, trivinylbenzene, trivinylnaphthalene, polyvinylanthracenes and the polylallyl and polyvinyl ethers of glycol glycerol, pentaerythritol, resorcinol and the monothio- or dithio-derivatives of glycols.

A preferred polyunsaturated monomer is divinylbenzene (DVB).

Suitable monoethylenically unsaturated monomers for the macroporous host copolymer include esters of acrylic acid, such as methyl acrylate, ethyl acrylate, propyl acrylate, isopropyl acrylate, butyl acrylate, tert-butyl acrylate, ethylhexyl acrylate, cyclohexyl acrylate, isobornyl acrylate, benzyl acrylate, phenyl acrylate, alkylphenyl acrylate, ethoxymethyl acrylate, ethoxyethyl acrylate, ethoxypropyl acrylate, propoxymethyl acrylate, propoxyethyl acrylate, propoxypropyl acrylate, ethoxyphenyl acrylate, ethoxybenzyl acrylate, ethoxycyclohexyl acrylate, the corresponding esters of methacrylic acid, styrene, o-, m-, and p-methyl styrenes, and o-, m-, and p-ethyl styrenes, dimethyl itaconate, vinyl naphthalene, vinyl toluene and vinylnaphthalene. A class of monomers of particular interest consists of the esters of acrylic and methacrylic acid with $C_1$–$C_{10}$ aliphatic alcohol.

The formation of the macroporous host copolymer will result in a precursor copolymer which will contain pendant functionalities which can be converted to weak acids. For example, referring to the FIGURE, if an ester of acrylic acid is used as the monoethylenically unsaturated monomer, the resultant host precursor copolymer will contain carboxylic acid ester groups which can later be converted to carboxylic acid groups by hydrolysis.

The crosslinked guest precursor copolymer will be formed from a polyunsaturated monomer and a monoethylenically unsaturated monomer containing functional groups which can be converted to weak bases. Suitable polyunsaturated monomers used to form the guest precursor copolymer are the same as the polyunsaturated monomers which may be used to form the host macroporous copolymer.

The suitable monoethylenically unsaturated monomers containing a functional group which can be converted to a weak base group are monoethylenically unsaturated monomers containing haloalkyl groups. Such haloalkyl groups include, but are not limited to, chloromethyl and/or bromomethyl. The groups will be attached to the monoethylenically unsaturated portion of the monomer, as in for example, p-vinyl benzyl chloride (VBC). Thus, for example, the crosslinked guest precursor copolymer may be formed by polymerization of VBC and divinylbenzene to form a guest precursor copolymer having pendant chloromethyl groups.

Methods for preparing the host macroporous copolymer are known in the art. See for example U.S. Pat. Nos. 3,275,548 and 3,357,158, incorporated by reference herein.

The hybrid resin useful in the process of the present invention in which the pores of the macroporous host copolymer are filled with a crosslinked guest copolymer are prepared by adding a monomer mixture containing the components necessary to form the crosslinked guest precursor copolymer to a suspension of the host macroporous precursor copolymer in water. While not intending to be bound by a particular theory, it is believed that the monomer is adsorbed or imbibed into the pores of the macroporous copolymer and the imbibed monomers are polymerized within the macroporous host copolymer beads by heating the mixture. Thereafter, the ion necessary functional groups are introduced to create the internal zwitterions relationship. Referring to the FIG., this may be done by treating the hybrid resin with a weak base such as dialkylamine to convert the haloalkyl groups to dialkylamine groups, and by hydrolysis to convert the preferred carboxylic ester groups, or other protected weak acid functionalities, on the host precursor copolymer to weak acid groups.

Since the guest copolymer is held within the pores of the host copolymer, the respective dialkylamine base and weak acid groups are in proximity and they thus can form internal zwitterions. When loaded with a salt comprising a cation and an anion, the cation and anion of the salt associate with the respective weak base and weak acid groups, thus, replacing the interaction of the zwitterions. Since no ion exchange takes place, thermal removal of the adsorbed salt may be accomplished at relatively moderate temperatures, typically in the range of about 60–100° C. Thus, the TRSS resins are thermally regenerable.

The formation of the crosslinked guest precursor copolymer in the presence of the macroporous host precursor copolymer is a polymerization generally carried out in the presence of a catalyst. Suitable catalysts include those which provide free radicals to function as reaction initiators include benzoylperoxide, t-butyl hydroperoxide, lauroyl peroxide, cumene hydroperoxide, tetralin peroxide, acetyl peroxide, caproyl peroxide, t-butyl perbenzoate, t-butyl diperphthalate, methyl ethyl ketone peroxide.

The amount of peroxide catalyst required is roughly proportional to the concentration of the mixture of monomers. The usual range is 0.01% to 5% by weight of catalyst with reference to the weight of the monomer mixture. The optimum amount of catalyst is determined in large part by the nature of the particular monomers selected, including the nature of the impurities that may accompany the monomers.

Another suitable class of free-radical generating compounds which can be used as catalysts includes the azo catalysts, including for example, azodiisobutyronitrile, azo-diisobutyramide, azobis($\alpha,\alpha$-dimethylvaleronitrile), azobis ($\alpha$-methyl-butyronitrile), dimethyl, diethyl, or dibutyl azobis(methyl-valerate). These and other similar azo compounds, which serve as free radical initiators, contain an —N=N— group attached to aliphatic carbon atoms, at least one of which is tertiary. An amount of 0.01 to 2% of the weight of monomer or monomers is usually sufficient.

Conditions for forming the guest precursor copolymer in the presence of the host macroporous precursor copolymer are known in the art. Typically the polymerization to form the guest precursor copolymer is conducted in a liquid, such as water that is not a solvent for monomeric material. However, a precipitant must also be present which acts as a solvent for the monomer mixture but which is chemically inert under the polymerization conditions. The presence of the precipitant causes a phase separation of the product hybrid copolymer. The determination and selection of such precipitants are known in the art.

The relative amounts of guest precursor polymer and MP host precursor copolymer can be varied over a wide range. It is desirable, however, to use at least 50 parts by weight of guest precursor copolymer per 100 parts by weight of MP base or host precursor polymer, with the maximum amount being dictated by that amount which can be imbibed or retained in or on the MP structure. This maximum will ordinarily be about 300 parts by weight of guest precursor copolymer per 100 parts by weight of base precursor polymer, although higher amounts can also be used. Preferably, the amounts of guest precursor copolymer to MP base will be in the range of about 100 to 200 parts of guest precursor copolymer per 100 parts of MP polymer.

The resins useful for performing the method of the invention are typically provided in a resin system comprising:

(a) a mass of sulfate-specific basic anion exchange resin containing basic groups selected from the group consisting of triethylamine, tributylamine and combinations thereof; and (b) a mass of thermally regenerable hybrid salt sorbent resin having two relatively independent phases comprising a first phase comprising a host macroporous copolymer of a polyunsaturated monomer and a monoethylenically unsaturated monomer containing weak acid groups and further comprising a second phase comprising a crosslinked guest copolymer of a polyunsaturated monomer and a monoethylenically unsaturated monomer containing weak base groups; wherein the pores of said host macroporous copolymer of said first phase are at least partially filled with the guest copolymer of the second phase;

(c) containment for the masses of resins whereby the aqueous fluid may flow sequentially through the mass of basic anion exchange resin and the mass of hybrid salt sorbent resin.

The system may also comprise a source of the aqueous fluid and an inlet to the containment for introducing the aqueous fluid to the mass of basic anion exchange resin.

The system also may comprise a source of a regenerant fluid and an inlet in the containment for introducing the regenerant fluid to the mass of hybrid salt sorbent resin whereby the regenerant fluid may flow sequentially through the mass of hybrid salt sorbent resin and mass of basic anion exchange resin.

The preferred configuration of the system comprises the anion exchange and TRSS resins in a dual bed in which the resins are regenerated in a countercurrent direction. The feed water will first contact the anion exchange resin, then the TRSS resin. During regeneration, the regenerant liquid flowing in the countercurrent direction will first contact the TRSS resin, then the anion exchange resin. It is an advantage that two separate regenerant liquids need not be used to respectively regenerate the anion exchange resin and the TRSS resin.

The system of sulfate-specific strongly basic anion exchange resins and TRSS resins according to the present invention may be used to remove the salts, including sulfates, from an aqueous solution. Thus the resin system has use for deionizing water, desalination, desalting urine to a level where it may be used directly as a nitrogen source for plants, purification for water regeneration on space vehicles, decolorizing sugar solutions, and decontaminating or purifying industrial waste water.

The liquid containing the salts (feed water) will first be contacted with the sulfate-specific anion exchange resin containing triethylamine and/or tributylamine groups. This will remove a substantial portion of the sulfate ions from the feed water which would interfere with the regeneration of the TRSS resins. Then the thus treated feed water will be contacted with the TRSS resins at a temperature range typically from about 5° C. to 25° C. To regenerate the hybrid resin, that is, to remove the cations and anions associated with the adsorbed salt from the resin, the spent TRSS resin will be contacted with or flushed with an aqueous regeneration liquid at a higher temperature, typically in the range of about 60–100° C. This regeneration liquid is then used to regenerate the anion exchange resin.

The following example is for illustration but is not intended to limit the invention in any way. In the present application, parts and percentages are given by weight unless otherwise stated.

EXAMPLE 1

Preferred TRSS resins may be made as follows:

1. Mix 110 g VBC, 46 g methyl isobutylcarbinol, 8.4 g 55% DVB and 11 g benzoylperoxide for 15 minutes to dissolve the peroxide.
2. Add the mixture from step 1 to 100 g XE-275 in a rolling container and imbibe for a minimum of 3 hrs.
3. Heat the rolling container for a minimum of 1.5 hrs. at 80° C. to polymerize.
4. Transfer to 3-neck flask after passing through 16-mesh sieve.
5. Add 800 ml 1N NaOH and 850 ml 40% dimethylamine.
6. Heat to boiling and reflux 1.5 hr. (about 75° C.).
7. Pour off solution and add fresh 850 ml 1N NaOH and heat at 90° C. for 1.5 hr.
8. Pour off liquid and rinse resin with deionized water to conductivity of 200.
9. Acidify with 1N HCl by adding acid at such a rate that pH does not go below 4 until a stable (for 1 hr) end point of pH 5.30 is reached. This normally takes several hours and about 550 ml 1N HCl.

Yield: about 500 ml finished resin.

The invention claimed is:

1. A method of treating an aqueous fluid to substantially reduce the concentration of dissolved salts comprising sulfates contained therein, comprising the steps of:
   (a) contacting a first volume of said aqueous fluid with a mass of sulfate-specific basic anion exchange resin containing basic groups selected from the group consisting of triethylaamine, tributylamine and combinations thereof;
   (b) then contacting said first volume of said fluid within a first temperature range with a mass of thermally regenerable hybrid salt sorbent resin having two relatively independent phases comprising a first phase comprising a host macroporous copolymer of a polyunsaturated monomer and a monoethylenically unsaturated monomer containing weak acid groups and further comprising a second phase comprising a crosslinked guest copolymer of a polyunsaturated monomer and a monoethylenically unsaturated monomer containing weak base groups; wherein the pores of said host macroporous copolymer of said first phase are at least partially filled with said guest copolymer of said second phase;
   (c) collecting said first volume from said hybrid salt sorbent resin.

2. The method according to claim 1 further comprising the steps of
   (d)(i) regenerating said hybrid salt sorbent resin by elution with an aqueous regenerant fluid within a second temperature range wherein said second temperature range is greater than said first temperature range to produce a spent regenerant fluid;
   (ii) regenerating said basic anion exchange resin by elution with said spent regenerant fluid;
   (e) collecting said spent regenerant fluid from step (ii);
   (f) optionally repeating steps (a), (b) and (c) using a second volume of said aqueous fluid.

3. A method according to claim 1 wherein said first temperature range is about 5° C. to 25° C.

4. A method according to claim 1 wherein said weak base groups comprise a dialkylamine group.

5. A method according to claim 1 wherein said weak acid groups comprise a carboxylic acid group.

6. A method according to claim 1 wherein said polyunsaturated monomer comprises divinylbenzene.

7. A method according to claim 1 wherein said basic anion exchange resin contains triethylamine groups.

8. A method according to claim 1 wherein said basic anion exchange resin contains tributylamine groups.

* * * * *

UNITED STATES PATENT AND TRADEMARK OFFICE
CERTIFICATE OF CORRECTION

PATENT NO.         : 7,235,180 B2                                    Page 1 of 1
APPLICATION NO. : 11/225942
DATED              : June 26, 2007
INVENTOR(S)        : Roger E. Johnson and Gerald Colombo It is certified that error appears in the above-identified patent and that said Letters Patent is hereby corrected as shown below:

Column 4, line 43, delete "isobomyl" and insert --isobornyl--

Signed and Sealed this

Tenth Day of February, 2009

JOHN DOLL
*Acting Director of the United States Patent and Trademark Office*